United States Patent
Todokoro

[11] 4,399,883
[45] Aug. 23, 1983

[54] TOY VEHICLE

[76] Inventor: Masatoshi Todokoro, Koganehara 2-chome, Matsudo-shi, Chiba-ken, Japan, 270

[21] Appl. No.: 257,636

[22] Filed: Apr. 27, 1981

[30] Foreign Application Priority Data

Jun. 25, 1980 [JP] Japan .................................. 55-89036

[51] Int. Cl.³ ............................................. B60K 17/02
[52] U.S. Cl. .................................. 180/65 E; 180/216; 74/850; 200/61.88; 280/1.11 R
[58] Field of Search ............ 180/65 A, 65 E, DIG. 3, 180/214, 65 R, 216; 280/87.02 R, 1.11 R, 87.01; 192/0.084; 74/850, 843, 872; 200/61.58 R, 61.91, 61.88

[56] References Cited

U.S. PATENT DOCUMENTS

| | | | |
|---|---|---|---|
| 3,136,174 | 6/1964 | Soulier | 74/850 |
| 3,664,450 | 5/1972 | Udden | 180/65 R |
| 3,687,249 | 8/1972 | Priest | 74/405 |
| 3,842,928 | 10/1974 | Kishi | 180/214 |
| 3,889,773 | 6/1975 | Chant | 180/65 E |
| 4,155,068 | 5/1979 | Zajichek | 200/61.88 |

*Primary Examiner*—David M. Mitchell
*Assistant Examiner*—Timothy Roesch
*Attorney, Agent, or Firm*—George B. Oujevolk

[57] ABSTRACT

A toy vehicle for children featuring a mechanism whereby the movement of the vehicle by the motive force of a motor and the movement by the human force can be switched at will by a simple lever operation. When the power circuit to the motor is cut off by operating a switch lever, the gear adapted to transmit the motive force of the motor is disengaged from the follower gear secured to the axle.

1 Claim, 6 Drawing Figures

TOY VEHICLE

BACKGROUND OF THE INVENTION

This invention relates to a toy vehicle modelled after an automobile, a steam locomotive or such and so constructed that a child can ride and drive it around.

There are known the toy vehicles of the type contemplated in which a battery and a motor are mounted in the vehicle body and the motive power of the motor is transmitted to the wheels or such transmission is cut off by operating a switch lever. In such toy vehicles, however, when the transmission of motive power of the motor is cut off, the gear mounted on the axle stays engaged with a part of an intermediate gear adapted to transmit the driving force to said gear, thus allowing a resistive force to act against free rotation of the axle, so that when the child riding thereon wants to let it move by his own force, for example, by kicking the ground by his legs, he is required to give a greater force to the vehicle than required for a toy vehicle which is designed to be moved by the rider's own force.

SUMMARY OF THE INVENTION

An object of this invention is to provide a toy vehicle having a mechanism that allows use of the device either as a motor-powered vehicle or as a "human-powered" vehicle, that is, a vehicle moved by the rider's own force.

Another object of this invention is to provide a toy vehicle which can be switched into a motor-powered drive or a human-powered run at will by a simple switch lever operation.

Still another object of this invention is to provide a toy vehicle of the type described having a mechanism whereby when the power circuit to the motor is cut off by an operation of the switch lever, the gear adapted to transmit motive power of the motor is disengaged from the follower gear secured to the axle, allowing free rotation of the axle.

The nature, construction and other details of this invention will become more apparent from the following detailed description of a preferred embodiment of the invention when taken in conjunction with the accompanying drawings.

DETAILED DESCRIPTION OF PREFERRED EMBODIMENT

Figure 1:
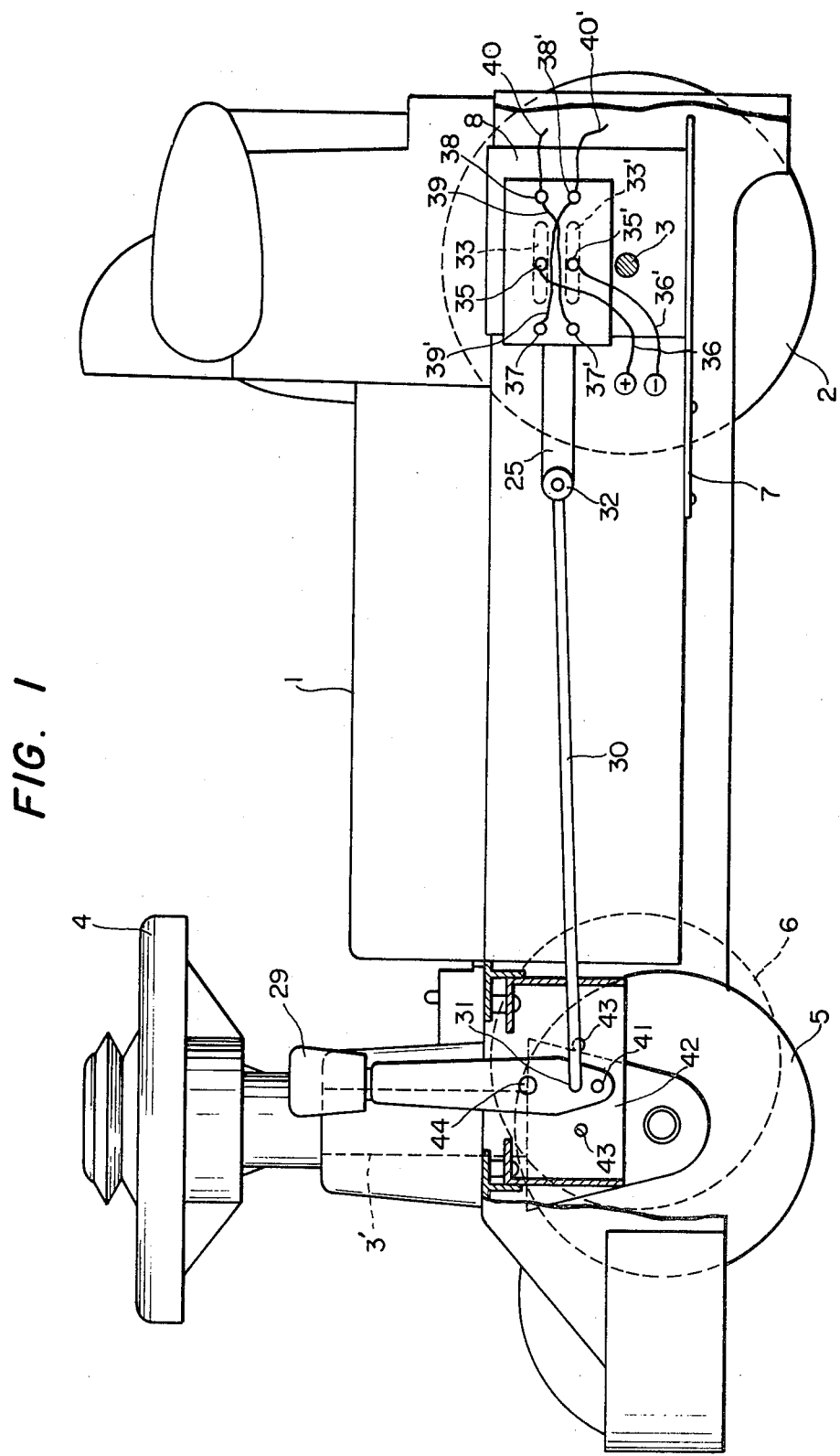
FIG. 1 is a side elevational view, with parts cut away, of a toy vehicle according to this invention.
Figure 2:
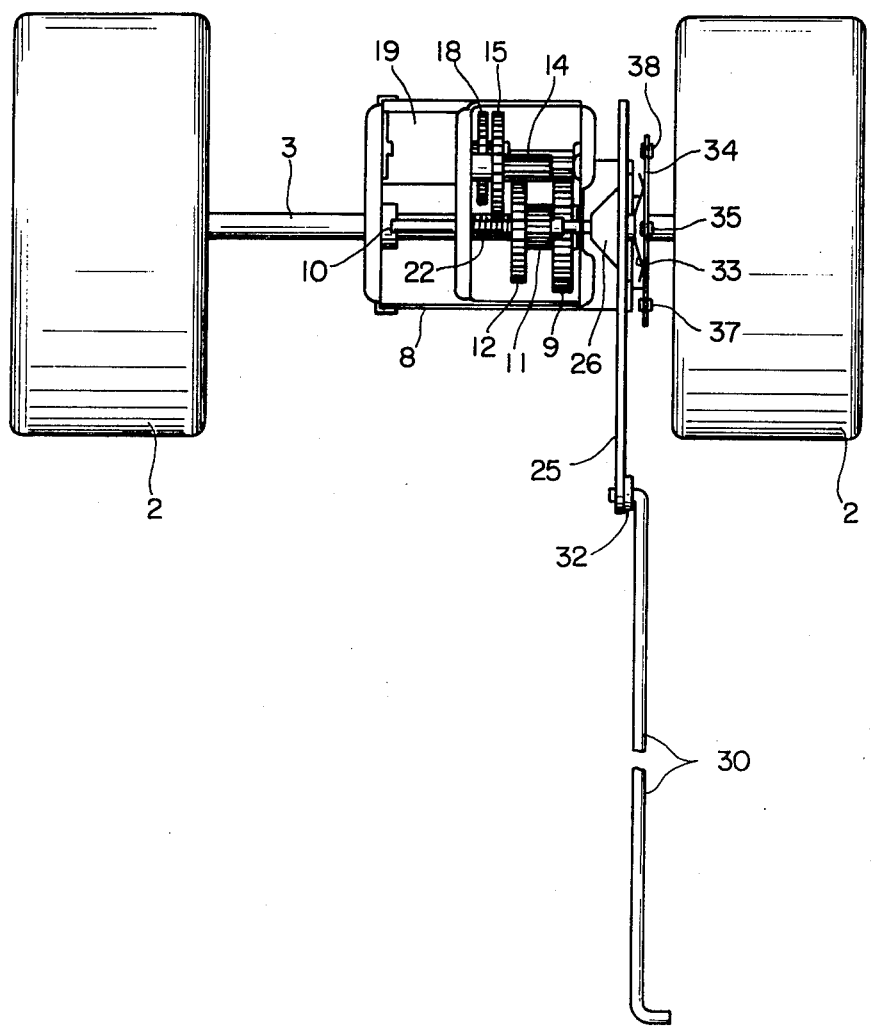
FIG. 2 is a plane view of the driving mechanism in the vehicle.
Figure 3:
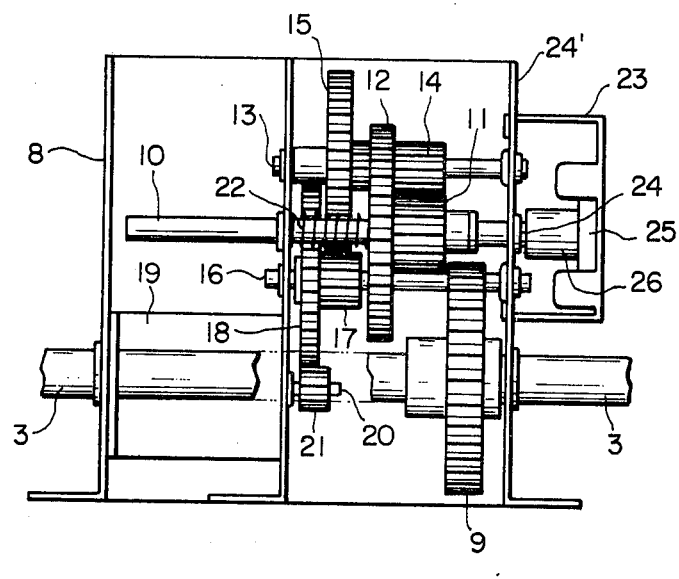
FIG. 3 is an enlarged frontal view thereof.

The invention is now described in detail by way of an embodiment thereof as illustrated in the accompanying drawings. Referring generally to the drawings, reference numeral 1 designates the body portion of the vehicle designed to a size that allows a child to sit down thereon. Numeral 2 indicates the rear wheels supported by an axle 3 at both ends in the rear portion of the vehicle body 1. In the front portion of the body 1 is provided a vertically supported handle shaft 3' having secured to its top end a handle 4. To the lower end of said handle shaft projecting downwardly of the body 1 is secured a steering wheel 5. Numeral 6 refers to a front wheel disposed on one side of the front portion of the vehicle body 1. Another similar front wheel is also disposed on the opposite side. Both front wheels are supported by an axle different from that of the steering wheel 5 and so arranged that they take a position slightly upwardly of the steering wheel 5. 7 is a bedplate secured to a rear bottom portion of the vehicle body 1. Mounted fixedly on said bedplate 7 is a frame 8 through which the axle 3 of the rear wheels 2, 2 is passed. Numeral 9 denotes a follower gear secured to that portion of the axle 3 which is located inside the frame 8, and 10 indicates a slide shaft also disposed in the frame 8, said slide shaft 10 extending parallel to the axle 3 and arranged slidable toward both ends of the axle 3. Said slide shaft 10 has fixedly mounted thereon a pinion gear 11 arranged engageable with the follower gear 9 and a gear 12 meshed with a shaft gear 14 secured to a shaft 13 disposed in the frame 8 in parallel to the slide shaft 10. Also secured to said shaft 13 is a gear 15 meshed with a pinion gear 17 mounted on a shaft 16 provided in the frame 8 in parallel to the shaft 13. A gear 18 is also mounted on the shaft 16, said gear 18 being meshed with a driving gear 21 secured to the shaft 20 of a motor 19 fixed to the frame 8.

The slide shaft 10 is loaded with a spring 22 which normally presses said slide shaft 10 to the position where the pinion gear 11 is engaged with the follower gear 9. Numeral 23 shows a side frame secured to a frame plate 24' of the frame 8 on the side where the end 24 of the slide shaft 10 projects out or retracts. A clutch plate 25 is supported inside the side frame 23 at a position opposing to the shaft end 24 such that said clutch plate 25 is slidable transversely to the axial direction of the slide shaft 10. Said clutch plate 25 is provided with a protuberance 26 designed to abut against the shaft end 24 to push the slide shaft 10 against the elastic force of the spring to the position where the pinion gear 11 is disengaged from the follower gear 9. Said protuberance 26 is bevelled on its both sides to form the slants 27, 28 along which the shaft end 24 is to slide.

Numeral 29 refers to a switch lever pivotally secured to a front part of the vehicle body 1. A connecting rod 30 is provided to connect the acting end 31 of said switch lever 29 to the corresponding connecting end 32 of the clutch plate 25. A pair of electroconductive contact pieces 33, 33' are provided on the side of the clutch plate 25 opposite from the protuberance 26, both ends of each said contact piece being bent so as to elastically slide on an insulator plate 34 supported spaced-apart from the clutch plate 25. 35 and 35' are the power terminals secured to the insulator plate 34 and connected via lead wires 36, 36' to the positive and negative poles of a battery (not shown) mounted in the vehicle body 1. Each of said power terminals is fixed at a position corresponding to the middle part of each contact piece 33, 33' in a situation where the protuberance 26 is pushing the slide shaft 10. Numerals 37 and 37' designate a pair of switching terminals fixed to the positions on the insulator plate 34 located forwardly of the power terminals 35, 35′, said switching terminals 37, 37′ being spaced-apart from each other by a distance equal to that between the corresponding ends of the contact pieces 33, 33′. Numerals 38 and 38′ indicate another pair of switching terminals fixed at the positions on the insulator plate 34 located rearwardly of the power terminals 35, 35′, said switching terminals 38, 38′ being spaced-apart from each other by a distance equal to that between the corresponding ends of the contact pieces 33, 33′. Denoted by numerals 39 and 39′ are the lead wires which are connected at one end to the respective switching terminals 37, 37′ while the other ends are crossed so as to be connected to opposite switching terminals 38, 38′. Another pair of lead wires 40, 40′ are provided for connecting the switching terminals 38, 38′ to the feeding terminal of the motor 19. 41 indicates a spring-loaded stopper protuberance provided at a position on the switch lever 29 disposed forwardly of its acting end 31. 42 represents a wall plate provided at a position where the fore end of said stopper protuberance 41 slides, and 43 indicates a slot formed in said wall plate 42 such that the stopper protuberance 41 will engage therein under the elastic force of the spring when the switch lever 29 takes its upright position or when it falls forwardly or backwardly of the vehicle body 1, thereby securing said switch lever 29 in any of said positions of movement.

Figure 5:
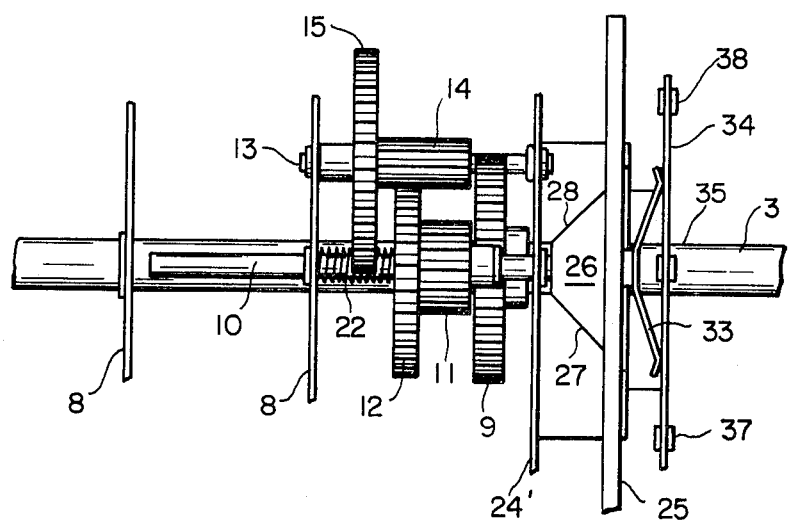
FIG. 5 is an enlarged plane view of the driving mechanism in a situation where transmission of motor power to the follower gear is cut off.

The toy vehicle of this invention having the just described mechanism is further described below from its operational aspect. When the switch lever 29 is brought to its upright position as shown in FIG. 1, the connecting rod 30 brings the clutch plate 25 to the middle position of the stroke of its back and forth movement. Accordingly, the protuberance 26 pushes the slide shaft 10 against the elastic force of the spring 22 as shown in FIG. 5, moving the pinion gear 11 to the position where it is disengaged from the follower gear 9, whereby the follower gear 9 is perfectly disconnected from the transmission gearing which transmits the motive power of the motor 19, thus bringing the axle 3 and the rear wheels 2, 2 secured to its both ends into a condition where they can rotate freely. At the same time, both ends of the contact pieces 33, 33′ move to the position where they contact the insulator plate 34 in the space between the respective power terminals 35, 35′ and the switching terminals 37, 37′ and 38, 38′, thus disconnecting the power from the motor 19.

Figure 4:
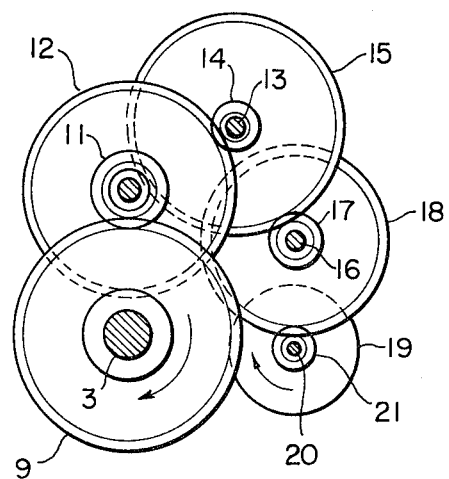
FIG. 4 is a diagrammatic view showing the positional relation of the gears adapted to transmit the motive power of the driving mechanism.
Figure 6:
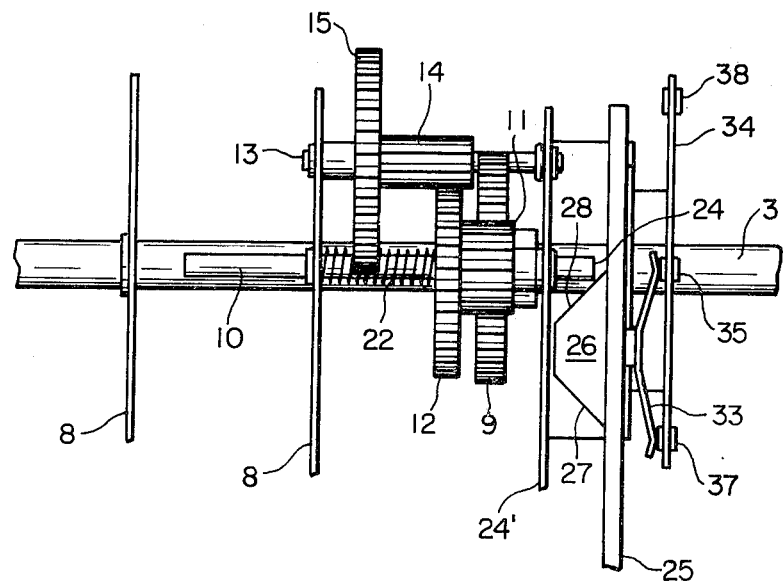
FIG. 6 is an enlarged plane view of the driving mechanism in a situation where motor power is being transmitted to the follower gear.

When the switch lever 29 is brought down backwardly of the vehicle body 1 from the position of FIG. 1 by turning said lever about the pivot 44, the clutch plate 25 is pulled forwardly of the vehicle body 1 by the connecting rod 30, whereby the protuberance 26 is urged to move to the position where it is disengaged from the end 24 of the slide shaft 10 as shown in FIG. 6, causing the slide shaft 10 to move under the force of the spring 22 to the position where the pinion gear 11 is engaged with the follower gear 9. The contact pieces 33, 33′ are also forced to move until their ends come into contact with the respective power terminals 35, 35′ and switching terminals 37, 37′, whereby power is connected to the motor 19 to let the motor shaft 20 turn, for example, in the direction indicated by arrow in FIG. 4. The rotation of the motor shaft is transmitted through the driving gear 21, gear 18, pinion gear 17, gear 15, shaft gear 14, gear 12, pinion gear 11 and follower gear 9 successively in that order, forcing the axle 3 to turn in the direction of arrow to accordingly turn the rear wheels 2, 2, allowing the vehicle 1 to move backwardly.

When the switch lever 29 is turned down about the pivot 44 forwardly of the vehicle body 1 from the position of FIG. 1, the clutch plate 25 is now pushed rearwardly of the vehicle body 1 by the connecting rod 30, forcing the protuberance 26 and contact pieces 33, 33′ to move contrariwise to the above-said movements which effected a reverse motion of the vehicle. Accordingly, the motor shaft 20 is turned oppositely to the direction of arrow in FIG. 4, and such rotation is transmitted through the driving gear 21 and other said transmission gearing to the follower gear 9 to let the axle turn oppositely to the direction of arrow, effectuating corresponding rotation of the rear wheels 2, 2 to allow the vehicle to move forwardly.

If the switch lever 29 is brought back to its upright position of FIG. 1 during forward or reverse movement of the vehicle, power is disconnected from the motor 19 in the manner described above to do away with the motor-powered drive of the vehicle.

Thus, according to the device of this invention, if the switch lever is so operated as to cut off transmission of motor power to the wheels, the follower gear on the axle is perfectly disengaged from the transmission gearing which transmits the motor power to break the power circuit to the motor, bringing the vehicle into a same structure as a toy vehicle which is equipped with no motor-driven mechanism, so that when the child rider wants to move the vehicle by his own force by disconnecting power to the motor, he is not required to exert any extra force such as required for the conventional motor-powered toy vehicles, and thus he can easily move the vehicle by his own force.

What is claimed is:

1. A toy vehicle comprising in combination:
   (a) a vehicle body with front and rear sections, a pivoted switch lever (29) at said front section, said switch lever (29) having a forward, disengage and backwards travel positions, a connecting rod (30) coupled at said front section to said switch lever (29) and extending to said rear section;
   (b) electric motor means with a feeding terminal and a frame at said rear section, said frame supporting therein a gear train and a follower gear (9), said gear train transmitting the motive power of said motor means to said follower gear (9), a drive axle (3) on which said follower gear (9) is mounted;
   (c) a slide shaft (10), with a pinion gear (11) mounted thereon, said pinion gear (11) slidably engaging and disengaging from said follower gear (9) depending on the position of said slide shaft (10), spring means (22) normally biasing said shaft (10) to the position where said pinion gear (11) engages said follower gear (9);
   (d) a slidable clutch plate (25) having thereon a protuberance (26) disposed to engage and push said slide shaft (10) against the elastic force of said spring means (22), said clutch plate (25) being connected to said connecting rod (30);
   (e) an insulator plate (34) in said rear section;
   (f) electroconductive contact pieces (33, 33′) on said clutch plate (25) and power terminals (35, 35′) disposed and arranged on said insulator plate (34), such that when said protuberance (26) is moved by operating said switch lever (29) away from the position where said protuberance (26) engages and pushes said slide shaft (10), said terminals (35, 35′) are connected with said contact pieces (33, 33′) to engage said motor;

(g) first and second switching terminals (37, 37'; 38, 38') on said insulator plate (34) at first and second spaced apart positions with circuits selectively connecting said first and second switching terminals so that when said switch lever (29) is in the forward position, said first switching terminals (37, 37') are connected to said power terminals (35, 35') and the connection is such as to drive the motor in a direction to move the vehicle forward while when said switch lever (29) is in the backwards position, said second switching terminals (38, 38') are connected to the power terminals (35, 35') the connection is such as to drive the motor in a direction to move the vehicle backwards, while when the switch lever (29) is in the disengage position, said protruberance (26) will disengage said pinion gear (11) from said follower gear (9); and, (h) spring loaded stopper protruberance means (41) on said switch lever (29, a wall plate (42) at said front section disposed for engagement by said stopper protruberance means (42), said wall plate (42) having slot means (43) to secure said switch lever in any position.

* * * * *